US011134118B2

(12) United States Patent
Liu

(10) Patent No.: US 11,134,118 B2
(45) Date of Patent: Sep. 28, 2021

(54) METHOD AND APPARATUS FOR BROWSER APPLICATION TO LOAD FIRST SCREEN OF WEB PAGE

(71) Applicant: ALIBABA GROUP HOLDING LIMITED, Grand Cayman (KY)

(72) Inventor: Xiang Liu, Guangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/716,336

(22) Filed: Dec. 16, 2019

(65) Prior Publication Data

US 2020/0195705 A1 Jun. 18, 2020

(30) Foreign Application Priority Data

Dec. 18, 2018 (CN) .......................... 201811550197.0

(51) Int. Cl.
*H04L 29/08* (2006.01)
*G06F 40/143* (2020.01)
*H04M 1/72445* (2021.01)
*G06F 40/205* (2020.01)

(52) U.S. Cl.
CPC ............ *H04L 67/04* (2013.01); *G06F 40/143* (2020.01); *H04L 67/02* (2013.01); *H04M 1/72445* (2021.01); *G06F 40/205* (2020.01)

(58) Field of Classification Search
CPC ..... G06F 40/143; G06F 40/205; H04L 67/02; H04L 67/04; H04M 1/72561
See application file for complete search history.

(56) References Cited

U.S. PATENT DOCUMENTS

| 8,782,214 | B1 | 7/2014 | Lopez |
| 8,965,880 | B2 | 2/2015 | Mizuno et al. |
| 8,977,653 | B1 | 3/2015 | Mahkovec et al. |
| 9,064,264 | B2 | 6/2015 | Reitsma et al. |
| 9,164,966 | B1 | 10/2015 | Llach et al. |
| 9,208,135 | B1 | 12/2015 | Lopez |
| 10,210,590 | B2 | 2/2019 | Du et al. |
| 10,244,270 | B2 | 3/2019 | Behbahani |

(Continued)

OTHER PUBLICATIONS

WIPO Patent Publication No. 2017206626A1 (Dec. 7, 2017) to Chen et al. ("Chen-Wipo")—English translation using US 20190058667 A1 to Chen et al. ("Chen-667") (Year: 2017).*

(Continued)

*Primary Examiner* — June Y Sison

(57) ABSTRACT

Embodiments of the present application provide a method, system, and a storage medium for a browser application to load a target page's first screen. The method comprises: in response to a request to load a target page, obtaining page information of the target page from a local storage associated with the browser application; rendering the page information of the target page, and requesting first screen information of the target page through a network; comparing the first screen information obtained through the network with the page information of the target page to determine whether the page information of the target page is updated; and in response to the page information of the target page being determined as updated, continuing to render the target page's first screen based on the first screen information obtained through the network.

13 Claims, 7 Drawing Sheets

(56) References Cited

U.S. PATENT DOCUMENTS

| | | | |
|---|---|---|---|
| 10,275,523 | B1 | 4/2019 | Wolkerstorfer et al. |
| 10,354,363 | B2 | 7/2019 | Kaldor |
| 2010/0262780 | A1* | 10/2010 | Mahan .................... G06F 15/16 |
| | | | 711/118 |
| 2011/0258532 | A1 | 10/2011 | Ceze et al. |
| 2012/0066586 | A1 | 3/2012 | Shemesh |
| 2014/0053059 | A1* | 2/2014 | Weber ..................... G06F 9/445 |
| | | | 715/234 |
| 2014/0067550 | A1* | 3/2014 | Chang ................ G06Q 30/0248 |
| | | | 705/14.68 |
| 2015/0220990 | A1 | 8/2015 | Kobyakov et al. |
| 2015/0242908 | A1 | 8/2015 | Kobyajov et al. |
| 2016/0077853 | A1* | 3/2016 | Feng ........................ G06F 9/54 |
| | | | 719/328 |
| 2016/0110455 | A1* | 4/2016 | von Bochmann ...... G06F 16/80 |
| | | | 707/709 |
| 2017/0329746 | A1* | 11/2017 | Chen ..................... G06F 16/986 |
| 2018/0205782 | A1 | 7/2018 | Wei et al. |
| 2019/0058667 | A1* | 2/2019 | Chen ....................... G06F 9/547 |
| 2019/0266289 | A1 | 8/2019 | Bartholomew |
| 2019/0384862 | A1 | 12/2019 | Gopalakrishnan et al. |

OTHER PUBLICATIONS

PCT International Search Report and the Written Opinion dated Mar. 5, 2020, issued in International Application No. PCT/US2019/066656 (7 pages).

\* cited by examiner

METHOD AND APPARATUS FOR BROWSER APPLICATION TO LOAD FIRST SCREEN OF WEB PAGE

CROSS REFERENCE TO RELATED APPLICATION

The present application is based on and claims priority to Chinese Patent Application No. 201811550197.0, filed on Dec. 18, 2018, which is incorporated herein by reference in its entirety.

TECHNICAL FIELD

The present disclosure relates to network front ends, and in particular, to a method and apparatus for a browser application to load a page's first screen.

BACKGROUND

With the development of Internet technologies and widespread use of mobile terminals, people are increasingly used to obtaining various information from the Internet. Among those, browser applications, in particular various browser APPs or APPs having browser functions installed on mobile terminals, have become tools commonly used by people to obtain information.

In the process of a browser application opening a web page, in particular when a page is opened by a browser APP installed on a mobile terminal with limited display area (e.g., a smart phone), the page loading performance is determined by the speed at which the page's first screen (e.g., above the fold content) is rendered. Front-end rendering (e.g., page is rendered at client-end instead of server end) requires downloading first screen data, parsing the data by executing JavaScript, and inserting various parsed tags into the page HTML document (e.g., HTML file). The browser kernel then parses the page HTML document, initiates a request for first screen images, decodes the loaded images, and renders the page, so that a user can see the page's first screen.

Since dynamic data needs to be downloaded from the Internet, it typically takes more than 600 ms. The execution of JavaScript to render first screen is also time-consuming. On mid-range to low-end smart phones with relatively poor JavaScript parsing and operation performance, the JavaScript parsing speed is about 1 MB/s, while the JavaScript for first screen typically exceeds 300 KB, which causes the first screen rendering time to be typically longer than 300 ms. Therefore, a user has to wait for a long time each time when a new page is opened, which severely affects the user experience.

Therefore, a solution capable of improving first screen performance is needed.

SUMMARY

To solve at least one of the above problems, the embodiments disclosed in the specification actively cache key page information at the front end, and perform page rendering based on the cached information, asynchronous updating and differential processing of the above key page information in parallel, thereby greatly improving the first screen loading performance and optimizing the user experience while ensuring the page's dynamic features.

According to some embodiments of the specification, a method for a browser application to load a target page's first screen is provided, the method comprising: in response to a request to load a target page, obtaining page information of the target page from a local storage associated with the browser application; rendering the page information of the target page, and requesting first screen information of the target page through a network; comparing the first screen information obtained through the network with the page information of the target page to determine whether the page information of the target page is updated; and in response to the page information of the target page being determined as updated, continuing to render the target page's first screen based on the first screen information obtained through the network.

In some embodiments, the method may further comprise: displaying the target page's first screen when the rendering of the target page's first screen is completed.

In some embodiments, the making a network request for first screen information of the target page comprises: making a network request for dynamic data of the target page's first screen. When the web address does not change, it is typically the page content, rather than the page framework, that is dynamically updated. Therefore, the dynamic data is sufficient to cover all changes to the first screen, thereby avoiding unnecessary network traffic and improving the first screen display speed.

In some embodiments, the first screen dynamic data may be data in json format.

In some embodiments, the comparing the first screen information obtained through the network request with the stored target page information comprises: performing dom-diff on the first screen information obtained through the network and the stored target page information to find an updated DOM tree node.

In some embodiments, wherein the in response to the page information of the target page being determined as updated, rendering the target page's first screen based on the first screen information obtained through the network may comprise: finding an updated DOM tree node and amending the updated DOM tree node based on the dynamic data in the target page's first screen; and rendering the amended DOM tree node.

In some embodiments, the method may further comprise: when page information of the target page to be displayed is not stored in the local storage, obtaining complete page information of the target page for rendering and displaying in response to a request from the user to load the target page, and storing the complete page information in the local storage. Thus, the page loading efficiency of subsequent page access may be improved through the buffer of the first access to the page.

In some embodiments, the method may further comprise: in response to the first screen information of the target page being determined as not updated, displaying the target page's first screen when the rendering of the page information of the target page is completed.

In some embodiments, the target page may be a front-end rendered page, a server rendered page, or a page that is at least partially isomorphic.

In some embodiments, the local storage may be a local storage created by the browser application, rather than HttpCache that cannot be controlled by the front end.

According to some embodiments of the specification, a system for a browser application to load a page's first screen is provided. The system may include a processor and a non-transitory computer-readable storage medium storing instructions executable by the processor to cause the system to perform operations comprising: in response to a request to load a target page, obtaining page information of the target page from a local storage associated with the browser application; rendering the page information of the target page, and requesting first screen information of the target page through a network; comparing the first screen information obtained through the network with the page information of the target page to determine whether the page information of the target page is updated; and in response to the page information of the target page being determined as updated, continuing to render the target page's first screen based on the first screen information obtained through the network.

According to some other embodiments of the specification, a non-transitory computer-readable storage medium for a browser application to load a page's first screen is provided. The non-transitory computer-readable storage medium may be configured with instructions executable by one or more processors to cause the one or more processors to perform operations comprising: in response to a request to load a target page, obtaining page information of the target page from a local storage associated with the browser application; rendering the page information of the target page, and requesting first screen information of the target page through a network; comparing the first screen information obtained through the network with the page information of the target page to determine whether the page information of the target page is updated; and in response to the page information of the target page being determined as updated, continuing to render the target page's first screen based on the first screen information obtained through the network.

BRIEF DESCRIPTION OF THE DRAWINGS

Exemplary implementation manners of the present specification are described in further detail with reference to the accompanying drawings, and the above-described and other objectives, features, and advantages of the present specification will become more obvious. In the exemplary implementation manners of the present specification, identical reference numerals typically represent identical parts.

DETAILED DESCRIPTION

Figure 1:
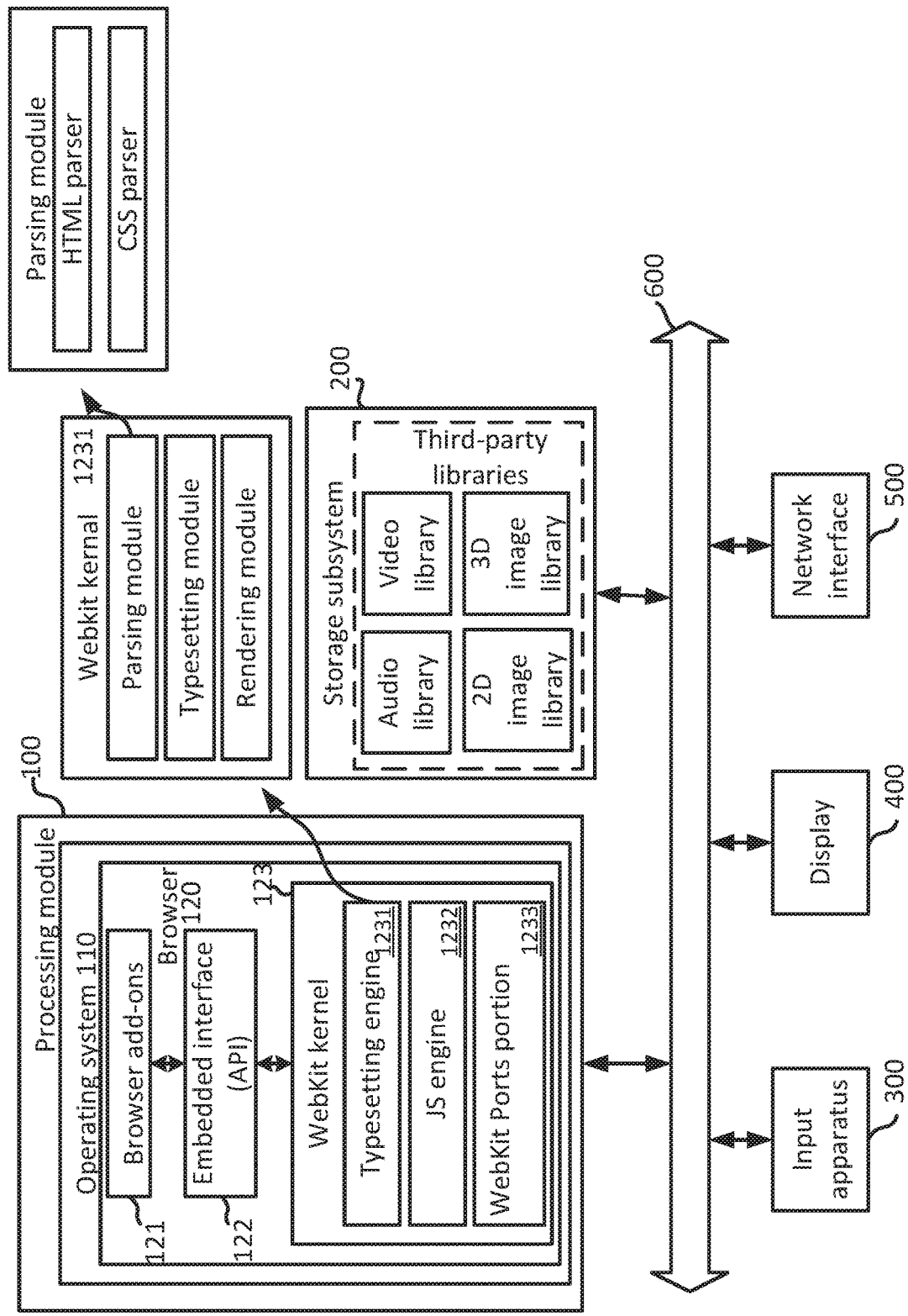
FIG. 1 illustrates an example structure of a computer with a Webkit kernel.

Preferred embodiments will be described in further detail below with reference to the accompanying drawings. Although the preferred embodiments illustrated in the accompanying drawings, it should be understood that the present specification may be implemented in various forms without being limited by the implementation manners elaborated herein. On the contrary, these implementation manners are provided for more thoroughly understanding the present specification, so that the scope of the present specification can be completely conveyed to one of ordinary skill in the art.

Nowadays, browser applications, in particular various browser APPs or APPs having browser functions installed on mobile terminals, have become tools commonly used by people to obtain information. The use of "browser application" or "browser" refers to a browser or other applications capable of displaying web pages, for example, various browser APPs or APPs having page browsing and page rendering functions that are installed on mobile terminals (e.g., smart phones).

When a page is opened by a browser APP installed on a mobile terminal with limited display area (e.g., a smart phone), the page performance is determined by the speed at which the page's first screen is rendered. For a front-end rendered page, first screen data needs to be downloaded, JavaScript is then executed to parse the first screen data, and then various parsed tags are inserted into the page HTML document. The browser kernel then parses the page HTML document, initiates a request for first screen images, decodes the loaded images, and renders the page, so that a user can see the page's first screen.

Since dynamic data needs to be downloaded from the Internet, it typically takes more than 600 ms. The execution of JavaScript to render first screen is also time consuming. On mid to low end smart phones with relatively poor JavaScript parsing and operation performance, the JavaScript parsing speed is about 1 MB/s, while the JavaScript for first screen typically exceeds 300 KB, which causes the first screen rendering time to be typically longer than 300 ms. Therefore, a user has to wait for a long time each time when a new page is opened, which severely affects the user experience. In view of this, the embodiments of the specification provide a solution that can improve the first screen performance, which performs rendering and content update in parallel by actively and flexibly caching page contents at the front end and using a dynamic update mechanism, thereby greatly improving the first screen performance while ensuring correct page display.

A browser may include two parts, kernel and shell, in terms of architecture. The browser kernel is in charge of interpretation of web page grammar (e.g., HTML, JavaScript, etc.) and web page rendering (display), e.g., the browser parses and renders a web page through the kernel. The browser shell is primarily responsible for the appearance interface and control experience of the browser.

The browser kernel is the core of the browser. Typically, the browser kernel is also referred to as a rendering engine. The rendering engine is configured to convert HTML/CSS/JavaScript texts and corresponding resource files thereof into image results for display.

Since most existing browsers use Webkit as the kernel, a computer structure having a Webkit kernel will be described in detail below. However, it should be understood that the basic operating principles of Webkit are substantially applicable to other browser kernels, such as the Blink kernel developed therefrom. The first screen loading solution according to the embodiments of the specification may also be applied to browsers based on other browser kernels.

FIG. 1 illustrates an example structure of a computer with a Webkit kernel. The computer may be embodied by various types of computer apparatuses, such as a desktop computer, a portable computer, a tablet computer, a smart phone, a personal digital assistant (PDA), or other types of computer apparatuses, which is not limited to any particular form. The computer may comprise a processing module 100, a storage subsystem 200, an input apparatus 300, a display 400, a network interface 500, and a bus 600.

The processing module 100 may be a multi-core processor or may comprise a plurality of processors. In some embodiments, the processing module 100 may comprise a general main processor and one or more special co-processors, such as a graphics processing unit (GPU), a digital signal processor (DSP), and the like. In some embodiments, the processor 100 may be realized by using a customized circuit, such as an application-specific integrated circuit (ASIC) or a field-programmable gate array (FPGA). In some embodiments, the processing module 100 may be a similar circuit that executes executable instructions stored in the storage subsystem 200. In the implementation manner illustrated in FIG. 1, the processing module 100 is provided with an operating system 110 and a browser 120 running on the operating system 110. The browser 120 comprises a Webkit kernel 123, an embedded interface 122, and some browser add-ons 121 that interact with the Webkit kernel 123 via the embedded interface 122. The Webkit kernel 123 (e.g., the rendering engine) may also comprise a typesetting engine (Webcore) 1231, a JS engine 1232, and a WebKit Ports portion 1233.

In the structure shown in FIG. 1, the typesetting engine 1231 further comprises three modules: a parsing module, a typesetting module, and a rendering module, wherein the parsing module may further comprise an HTML parser and a CSS parser. The HTML parser comprises a tag generator and a tree constructor. The tag generator is configured to parse inputted web page contents (typically in the form of an XML document) into a plurality of HTML tags. The HTML tags include a start tag, an end tag, attribute names, and attribute values. The tag generator is configured to identify these tags, transfer the tags to the tree constructor, and then receive the next character to identify the next tag, which is repeated until the end of the input.

The JS engine 1232 is configured to parse the Javascript language and achieve dynamic effects of a web page by executing the Javascript language. The JS engine may be a JavaScripCore engine or a V8 engine. The JavaScripCore engine is the default JS engine in WebKit. In the Chromium open-source project of Google, the JavaScripCore engine is replaced by the V8 engine, and the V8 engine is an open-source JavaScript engine developed by Google.

The WebKit Ports portion 1233 comprises network stack, hardware accelerators, video, text, image decoders, and loading module (network stack) and other functional modules. The resource loading of WebKit is implemented by the ports, and therefore, the network implementation manner may be different for each port.

The storage subsystem 200 may comprise various types of storage units, such as a system memory, a read-only memory (ROM), and a permanent storage apparatus, wherein ROM may store static data or instructions required by the processing module 100 or other modules of the computer. The permanent storage apparatus may be a writable and readable storage apparatus. The permanent storage apparatus may be a non-volatile storage device that does not lose stored instructions and data even when the computer is powered off. In some embodiments, a large-capacity storage apparatus (e.g., a magnetic or optical disk, a flash memory, etc.) is used as the permanent storage apparatus. In some other embodiments, the permanent storage apparatus may be a removable storage device (e.g., a floppy disk, an optical drive, etc.). The system memory may be a writable and readable storage device or a volatile writable and readable storage device, such as a dynamic random-access memory.

The system memory may store instructions and data required by some or all processors in operations. In addition, the storage subsystem 200 may comprise a combination of any computer readable storage media, including various types of semiconductor storage chips (DRAM, SRAM, SDRAM, flash memory, and programmable read-only memory), as well as magnetic disks and/or optical disks. In some embodiments, the storage subsystem 200 may comprise a removable readable and/or writable storage device, such as a compact disc (CD), a read-only digital versatile disc (e.g., DVD-ROM, dual-layer DVD-ROM, etc.), a read-only Blu-ray disc, an Ultra Density Optical disc, a flash memory card (e.g., an SD card, a min SD card, a Micro-SD card, and the like), a magnetic floppy disk, and the like. The computer readable storage media do not include carriers and transient electronic signals transmitted in a wireless or wired manner. In some embodiments, the storage subsystem 200 can store one or more software programs that can be executed by the processing module 100 or resource files to be called. The resource files may include some third-party libraries, including but not limited to an audio library, a video library, a 2D image library, a 3D image library, etc.

The user interface may be provided by one or more user input apparatuses 300, display 400, and/or one or more other user output apparatuses. The input apparatus 300 may include an apparatus for a user to input signals into a computer, and the computer can interpret that these signals contain particular user requests or information. In some embodiments, a keyboard may be used to input a web address to the user interface, and the browser 120 is required to display web page contents corresponding to the inputted web address via the user interface. In some embodiments, the input apparatus 300 may include some or all of keyboard buttons, a touchscreen, a mouse or other pointing devices, a wheel, a clicking wheel, a dial, a button, a switch, a small keyboard, a microphone, and the like.

The display 400 may display images generated by the computer and may comprise a set of various types of image devices, such as a cathode ray tube (CRT), a liquid crystal display (LCD), a light-emitting diode (LED) (including organic light-emitting diode (OLED), a projection system, and the like, and other supporting electronic apparatuses (e.g., DAC, ADC, signal processors, and the like). In some embodiments, other user output devices may be provided additionally or to replace the display 400, such as a signal light, a speaker, a touch sensor, a printer, and the like.

In some embodiments, the user interface may be provided through a graphic user interface. Some visible graphic elements are defined in some areas of the display 400 as interaction objects or control objects that a user may select through the input apparatus 300. For example, the user may operate the input apparatus 300 to move to a designated position on the screen for inputting a web address, and control the browser to display web page contents corresponding to the web address on the display 400. In some embodiments, a touch device capable of identifying user gestures may be used as the input device. These gestures may, but are not required to, be associated with the array on the display 300.

The network interface 500 provides voice and/or data communication functions for the computer. In some embodiments, the network interface 500 may comprise a RF transceiver for transferring voice and/or data (e.g., a data network technology that uses a cellular phone technology, such as 3G, 4G or EDGE, WIFI), a GPS receiving module and/or other modules. In some embodiments, the network interface 500 may provide an additional wireless network connection or alternative wireless interface. The network interface 500 may be a combination of hardware (e.g., an antenna, a modem, a codec, and other analog and/or digital signal processing circuits) and software modules.

The bus 600 may comprise various system buses, peripheral device buses, and chip buses for connecting components inside the computer. For example, the bus 600 may connect the processing apparatus 100 and the storage subsystem 200, and may further connect the input apparatus 300 and the display 400. The bus 600 may also cause the computer to be connected to a network via the network interface 500. In this case, the computer may function as a part of multiple online computer devices. Some or all components of the computer may coordinate with each other in the implementation of the embodiments of the specification.

Some embodiments may comprise electronic parts such as a micro-processor, a memory that stores computer instructions and data in a computer readable storage medium. Many features described herein may be implemented by executing methods and steps of computer instructions stored on the computer readable storage medium. When these computer instructions are executed, a computer processing unit completes all functions of the instructions. Program instructions and computer encoding may be implemented as machine codes, such as codes obtained by compiling advanced languages using a computer, an electronic element, or a microprocessor of a parser.

Through proper programming, the processing apparatus 100 may implement a variety of functions for the computer. For example, the processing apparatus 100 downloads web page contents from a server via the network interface 500 to the storage subsystem 200. Then, the processing apparatus 100 reads a web page file from the storage subsystem 200 and transfer it to the typesetting engine 1231. The parsing module of the typesetting engine 1231 parses the web page and constructs a DOM tree. When the DOM tree is created, the typesetting module of the typesetting engine 1231 receives style information of the CSS parser and constructs a new internal painting model (RenderObject Tree, also referred to as a typesetting tree), and the typesetting module calculates position and size of each element in the model. Subsequently, the rendering module completes the painting from the model to an image. In the above process of displaying web page contents, the processing apparatus 100 may also read an audio file from the audio library and/or read a video file from the video library and/or read a 2D image and/or 3D image from the 2D image library and/or 3D image library of the third-party libraries associated with the storage subsystem 200 through a bus, and then generate a final image for display on the display 400.

It should be understood that the computer is exemplary. The computer may have other functions that are not described in detail (e.g., mobile calls, GPS, power management, one or more cameras, various connection ports or accessories for connection to peripheral devices, and the like). Furthermore, particular functional modules of the computer 100 are descried herein for ease of description and do not mean particular physical configurations of the functional parts. Moreover, these functional modules do not need to correspond, one to one, to physical modules. The modules may be configured to complete various operations, such as through programming or setting a proper control circuit. The modules may also be re-configured according to initial settings. The embodiments may be implemented in various devices, including electronic devices, through a combination of hardware and software.

In the implementation manner shown in FIG. 1, the main role of the browser is to display web pages. At present, web pages are a type of documents written by HTML language. With the development of technologies, web pages may have more styles. For example, CSS (Cascading Style Sheet) style language and JavaScript language may be used to control web page display features, wherein CSS may be used to describe display information of a web page, while JS codes may be used to control internal logic of the web page).

CSS is a style sheet language, which defines a series of style rules applying to elements for describing display information of the elements and controlling display styles of web pages. The parsing process of CSS refers to a process in which a CSS character string is processed by a CSS parser into a representation of internal rules of a rendering engine. When CSS contents need to be parsed, Webkit calls a parser to parse the CSS style and stores the results.

A computer structure and web page structure using a Webkit kernel are described above. The process of a browser displaying web page contents may include loading, parsing, typesetting, rendering, and displaying.

Figure 2:
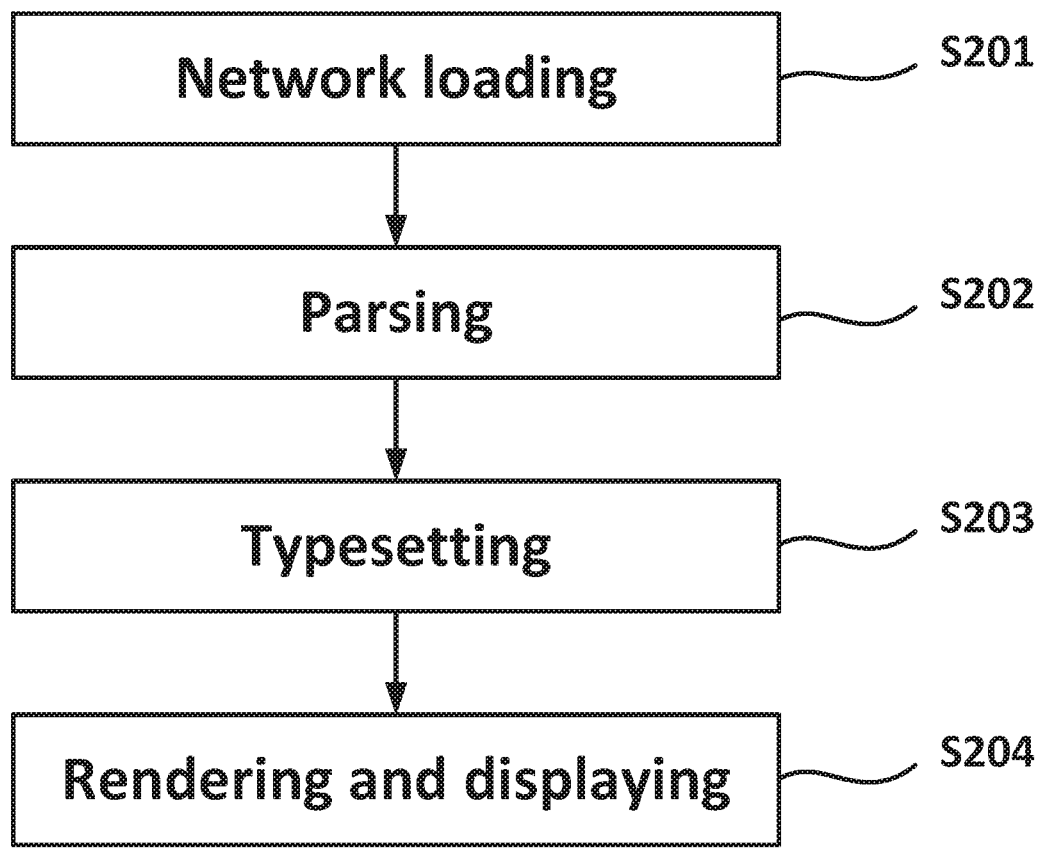
FIG. 2 is an example schematic diagram of a conventional flow chart of page display by a browser.

Referring to FIG. 2, FIG. 2 is an example schematic diagram of a conventional flow chart of page display by a browser. In the steps shown in FIG. 2, first, a loading module requests web page contents according to an inputted web address, and inputs the web page contents into a parsing module (step S201); and the parsing module parses the web page contents to obtain a DOM tree and CSS information of relevant nodes (step S202).

In step S202, when the loading module inputs the web page contents into the HTML parser of the parsing module, the HTML parser performs parsing the web page contents while constructing a DOM tree. The DOM tree is an object representation of HTML documents and also an interface between external contents (e.g., JavaScript) and HTML elements. During this period, encountered JS codes may be transferred to the JS engine for processing, and a processing result from the JS engine may be returned to the parsing module for parsing. If a web page contains CSS codes, the CSS codes may be transferred to the CSS parser for parsing. Through the analysis of an XML document, the entire document is transformed into a DOM tree and stored in the memory. An application may access and operate any part of the DOM tree at any time with no limitation to numbers of access and operations. Moreover, the XML document may be amended by amending the document tree.

In the process of the JS engine parsing a script, the HTML parser stops parsing of the XML document until the script parsing is completed. If the script is external, it is also necessary to synchronously grab external script resources from the Internet for parsing, and after the parsing is completed, the XML document is continued to be parsed. In some embodiments, the script in an XML document may also be marked as "defer." Then, the document parsing will not be stopped, and the script will be executed after the document parsing is completed. At present, an option is added in HTML5 that a script may be marked as asynchronous so that the script can be parsed and executed by other threads.

In step S203, the web page is typeset. After parsing is completed, the typesetting module constructs a new internal painting model (e.g., RenderObject Tree) according to a parsing result (the DOM tree and CSS information of relevant nodes) of the parsing module and calculates position and size of each element in the internal painting model.

Subsequently in step S204, the rendering module paints the internal painting model (e.g., RenderObject Tree) into an image. When WebKit renders a web page, the rendering module traverses RenderLayer trees from the root node, accesses each render layer in each RenderLayer tree until reaching leaf nodes, and then traverses render objects belonging to this render layer to paint each render object. The RenderLayer trees determine a layer sequence of web page painting, while render objects belonging to a render layer determine the content of this layer. All render layers and render objects jointly determine the content of a web page that is ultimately displayed on the screen.

Each object of a render layer may be imagined as one layer of the image, and all layers jointly form the image. Each layer corresponds to one or some visible elements in the web page, and the contents of all these elements are painted to this layer. Such a process is referred to as paint.

The browser itself cannot directly change pixel outputs of a screen, which needs to be completed by a GUI Toolkit of the system. Therefore, the browser would typically package a web page to be displayed into a user interface component (UI component), which is usually referred to as a WebView, and then display the web page on the screen by placing the WebView on the UI component of an application.

Synthesizer was not used in rendering architectures of past browser kernels. A browser kernel painted web page contents (RenderLayer and RenderObject) directly into a window buffer. Afterwards, Synthesizer has been introduced into rendering architectures of current browser kernels. In some embodiments, each layer has a painting storage area, and the storage area is used to save painting results. At last, contents of these layers are combined into the same image, which is referred to as synthesis. Rendering with synthesis technology is referred to as synthesized rendering. A browser kernel first generates a content snapshot from the web page content, then a synthesizer rasterizes the content snapshot, and the rasterized buffer is further synthesized to the window buffer. If GPU is used for synthesis, it is referred to as hardware acceleration. Therefore, current rendering implementations include software rendering and hardware rendering.

Figure 3:
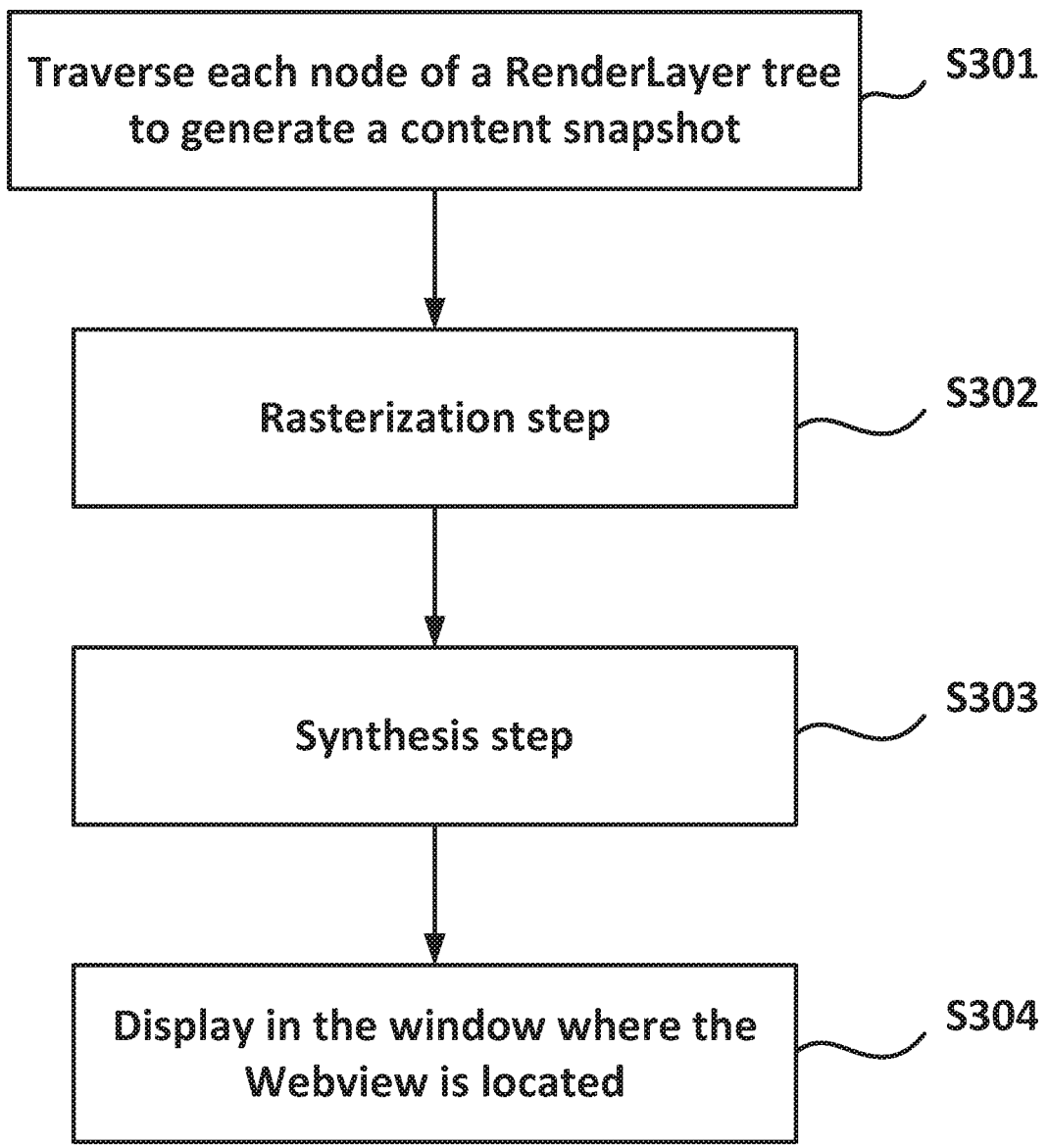
FIG. 3 is an example flow chart of rendering implementation by a browser.

Referring to FIG. 3, FIG. 3 is an example flow chart of rendering implementation by an existing browser.

Step S301: the rendering engine traverses all nodes of a RenderLayer tree to generate a content snapshot for each node (completed by a Webkit layer and CPU).

Step S302: the content snapshot is rasterized in the synthesizer, and the content snapshot is converted to an off-screen buffer by an adaptation layer or CPU, which is converted to true pixel color values by using some paint instructions.

Step S303: this step involves Composite, which is responsible for copying the buffer, and may also include operations such as Translation, Scale, Rotation, Alpha mix and the like. The synthesizer is in charge of copying the internal buffer, e.g., the off-screen buffer, to the window buffer (completed by an adaptation layer and GPU). Meanwhile, it may also include operations such as Translation, Scale, Rotation, Alpha mix and the like.

The time used for synthesis in the step S303 is typically far less than the time consumed by painting contents of a web page, while the latter is generally within several milliseconds even on a mobile device. For most of the time, it is only necessary to paint a very small area, rather than an area with the size of a complete WebView. As a result, the overhead of the painting step is effectively reduced.

Step S304: a rendered memory bitmap is displayed in the window where the Webview is located. The rendering process may, for example, place the rendered memory bitmap in a shared memory, and then notify the browser process via an IPC message for interface update. Upon receiving the IPC notice, the browser process uses an operating system API to paint the memory bitmap to a Webview corresponding to the tag.

A general process of a browser application displaying a page is described above with reference to FIG. 1 to FIG. 3. In the process of the browser application displaying a Web page, the page content, e.g., an HTML document, needs to obtained first via the network. Subsequently, the obtained page content may be rendered and displayed typically through processes like JS execution, resource request, parsing, typesetting, rendering, and the like. This process may result in a long wait by a user before the page content can be completely displayed (e.g., seeing a white screen). In the case where network connection is weak or a terminal device has limited resources, the wait time before the first screen display may be even longer, which may severely affect user experience.

Thus, the embodiments of the specification actively buffer key page information at the front end and display different updates, which can improve the page display in a more flexible manner, and in particular, improve the first screen loading efficiency, thereby reducing the wait time for the user and improving the user experience.

Figure 4:
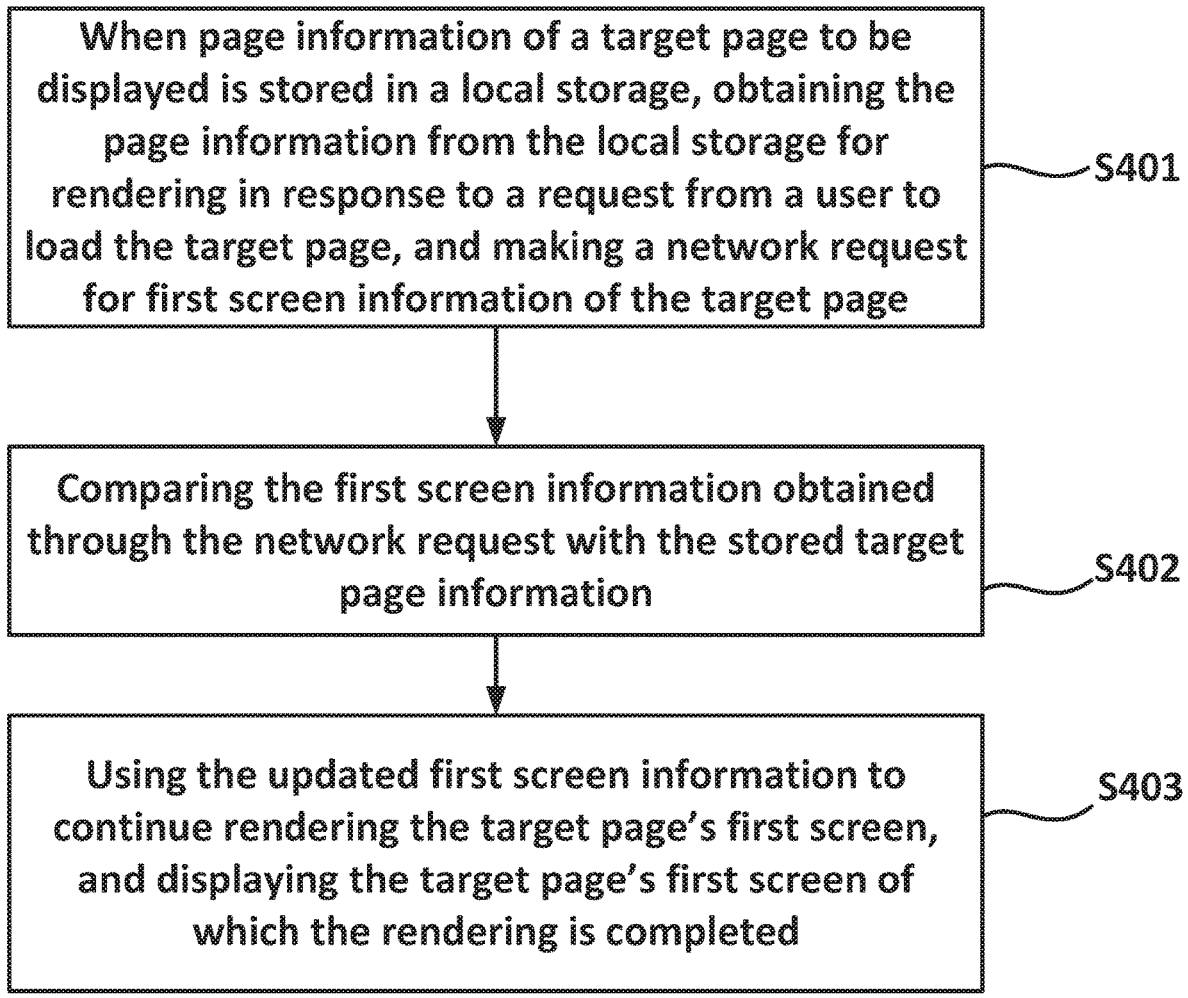
FIG. 4 is a schematic flow chart of a method for a browser application to load a page's first screen according to some embodiments.

FIG. 4 is a schematic flow chart of a method for a browser application to load a page's first screen according to some embodiments. It should be understood that this method may be implemented in a browser application or an application having browsing functions, in particular by a browser APP installed on a mobile terminal (e.g., a smart phone installed with an Android system).

In step S401, when page information of a target page to be displayed is stored in a local storage associated with the browser application, the page information is obtained from the local storage for rendering in response to a request from a user to load the target page, and a request through a network is made for first screen information of the target page.

The request from a user to load the target page herein may comprise an action of the user to input a target page's web address (e.g., URL) in any direct or indirect manner. For example, the user may input the URL of the target page in an address bar, click a bookmark or a corresponding button on the navigation page, and the like. Regardless of a specific operation performed by the user, the corresponding action thereof may cause the browser application to know that the user intends to access the target page. Therefore, the browser application may check whether page information of the target page is stored in the local storage (e.g., also based on the URL of the target page). If so, the page information may be obtained from the local storage and the page display process shown in FIG. 2 may be immediately performed (e.g., comprising parsing, typesetting, rendering, and displaying). At the same time, the browser application also makes one or more requests based on the above URL to at least obtain first screen information of the target page.

In step S402, the browser application compares the first screen information obtained through the network request with the stored target page information to determine if the stored target page information has been updated. Subsequently, when the first screen information is updated (e.g., the currently obtained first screen information is different from the previously stored page information), the browser kernel uses, in step S403, the updated first screen information to continue rendering the target page's first screen, and displays the target page's first screen when the rendering of the target page's first screen is completed.

In this way, while the page information stored locally is used for rendering, the first screen information is obtained from the Internet and updated when needed, which may ensure the dynamic features of the page and greatly shorten the time required for first screen to be displayed. In other words, the cached information-based page display process and the dynamic data obtaining and comparing process are performed simultaneously. Moreover, in the event that the currently obtained dynamic data is updated, the above dynamic data-based process is incorporated into the conventional page display process.

In some embodiments, the "first screen" refers to the content displayed on the first screen of a page (e.g., above the fold content) on the screen of a terminal device. Since display screens of terminal devices (usually smart phones) have different sizes and resolutions, the actually obtained "first screen data" is typically not strictly first screen data, but contents that are a little more than the contents that can be displayed by one screen of the current terminal, e.g., data on one and half screen. In some embodiments, the "first screen data" may be defined according to the understanding of those skilled in the art in a relatively free manner, which is not limited by the present invention.

In some embodiments, since the user typically needs time to read the first screen, the browser application has relatively abundant time to perform loading and displaying of subsequent screens. Therefore, the display speed of the first screen itself is critical to user experience. Thus, in the step S401, the page data obtained locally by the browser application for rendering and displaying may also be data corresponding to the first screen, thereby improving the data's own rendering efficiency.

In addition, to improve the efficiency of the dynamic data obtaining and branch comparing (or update detecting), the first screen information by the network request in the step S401 may only comprise dynamic data on the first screen of the target page. When the web address does not change, it is typically the page content, rather than the page framework, that is dynamically updated. Therefore, the dynamic data is sufficient to cover all changes to the first screen, thereby avoiding unnecessary network traffic and enabling the browser application to more rapidly obtain all desired first screen information.

In one embodiment, the first screen dynamic data may be data in json format to facilitate subsequent comparison processing. Correspondingly, the step S402 may comprise: performing dom-diff processing on the first screen information obtained through the network request and the stored target page information to find an updated DOM tree node. Thus, rapid comparison of page changes is achieved through the dom-diff mechanism. Here, the data in the json format can further improve the data comparison speed.

In one embodiment, the above action of comparison process may be initiated by the front-end JavaScript and executed in the js engine in the browser kernel. The comparison instruction may be included into the page's JavaScript code, so that the previously stored and currently obtained copies of json data can be compared through the dom-diff process to identify attribute differences, which may be re-inserted into the DOM tree. Subsequently, the browser kernel may typeset and render the above updated DOM data, and display a corresponding page.

For example, the previously stored (data A) and subsequently updated (data B) json data may be as follow:

data A: {"backgroundImage":"https://example.com/image_a.png"}
data B: {"backgroundImage":"https://example.com/image_b.png"}

By comparing the above two copies of json data, it can be seen that the (background image) backgroundImage is changed to image_b.png, and therefore, the above change may be reflected to a corresponding DOM tree node.

In one embodiment, the step S403 may comprise: finding an updated DOM tree node and amending the updated DOM tree node based on the first screen dynamic data; rendering the amended DOM tree node; and displaying the target page's first screen when the rendering of the target page's first screen is completed. Thus, the update of amendments is achieved directly in the DOM tree phase, which further shorten the time consumed caused by page updates.

The above rapid loading solution according to the embodiments of the specification needs to be supported by relevant operations of the browser application in first page access. Therefore, in one embodiment, the loading method according to the embodiments of the specification may further comprise: when page information of the target page to be displayed is not stored in the local storage, obtaining complete page information of the target page for rendering and displaying in response to a request from the user to load the target page, and storing the complete page information in the local storage. Thus, the page loading efficiency of subsequent page access is improved through the buffer of the first access to the page.

In addition, the loading method according to the embodiments of the specification may further comprise: when confirming that the first screen information is not updated, displaying, by the browser kernel, the target page's first screen when the rendering of the page information is completed. In other words, the browser kernel first needs to determine that there is no update before displaying the page, thereby ensuring the correct display of the dynamic portion of the page. However, since the time required for obtaining and comparing dynamic information is typically close to or shorter than the time required for the page display process, the above process of obtaining and comparing dynamic information does not have significant impact on the first screen display time when the first screen information is not updated.

In some embodiments, the embodiments of the specification may be applicable to front-end rendering solutions. Here, a front-end rendered page means that the HTML content of the page is generated by executing JS dynamic insertion at the front end. Furthermore, the embodiments of the specification may also be applicable to server-end rendering solutions, and at least partially isomorphic web development (e.g., rendering pages on both the server and client side). A server rendered page means that the HTML content of the page is fully generated by a server, and what the user obtains through a request is a complete HTML document. The server-end rendering is typically combined with an HTML document cacheable mechanism to work. The HTML document cacheable mechanism means that a document may be cached in HttpCache, but the storage form and storage time of the document in HttpCache cannot be controlled by the front end, making it difficult to ensure that the document is promptly updated.

To this end, the local storage used in the embodiments of the specification may be a dedicated local storage created by the browser application (e.g., a local storage dedicated to executing the first screen loading solution according to the embodiments of the specification), rather than HttpCache that cannot be controlled by the front end. Thus, the front end (e.g., the browser application) can more flexibly control the loading and obtaining of web page contents, thereby providing rapid first screen loading that fully implemented by the front end.

Figure 5A:
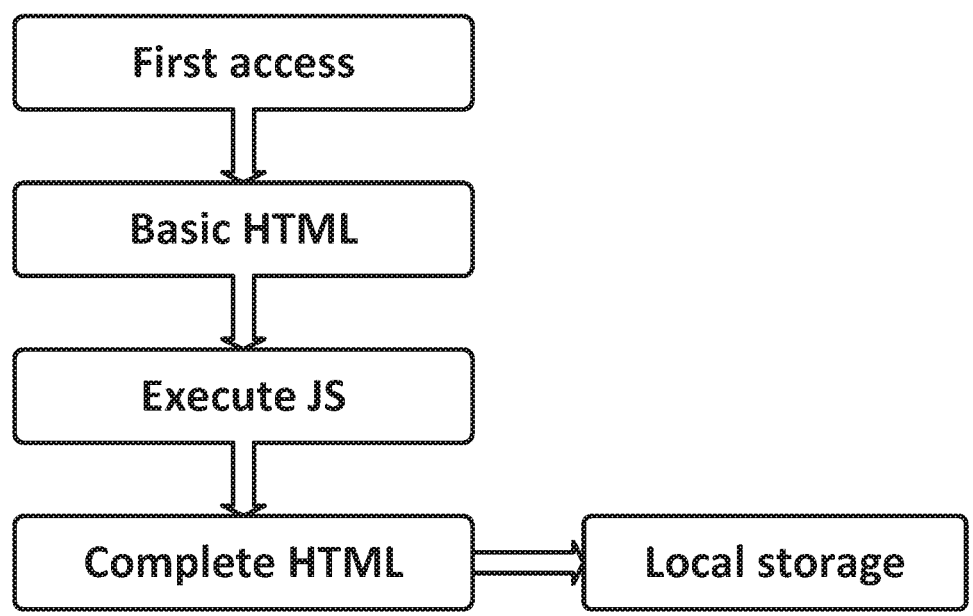
FIGS. 5A and 5B illustrate examples of operations of first access and subsequent access to a target page according to some embodiments.
Figure 5B:
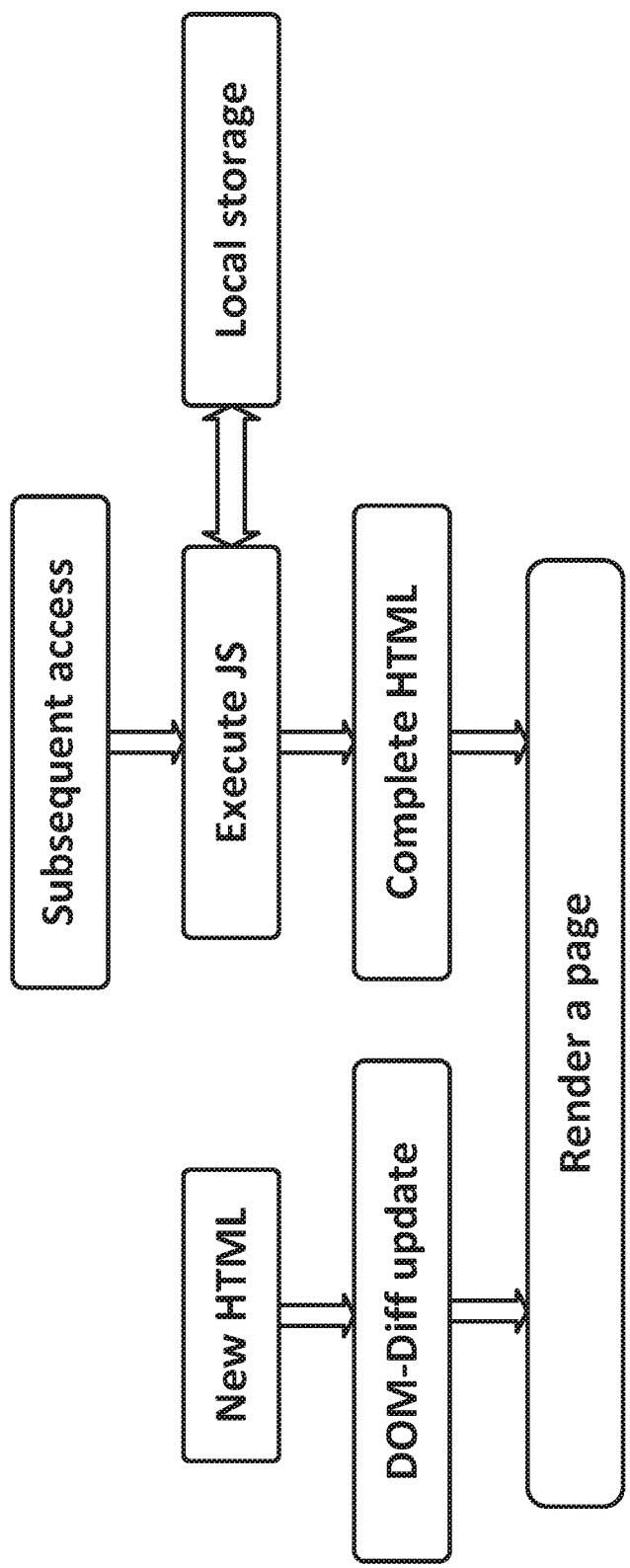

FIGS. 5A and 5B illustrate examples of operations of first access and subsequent access to a target page according to some embodiments.

As shown in FIG. 5A, during the first access to a target page, to display the first screen, it is necessary to download first screen data (basic HTML), execute JS to process the first screen data, parse to obtain first screen tags, and insert the tags into the HTML document to finally generate a complete HTML document (the completed HTML), and the HTML document is cached into the local storage.

As shown in FIG. 5B, during subsequent access to the target page, the HTML document may be directly read from the local storage, the browser may directly parse and typeset the HTML document, load images, decode and render the images, and then render the page.

At the same time, to ensure that the user views the latest page content, while rendering the locally cached page, it is also necessary to request new first screen data (e.g., new HTML). After the requested data is obtained, the dom-diff process is performed to find an updated node, the node corresponding to the page is amended accordingly, and the page continues rendering the changed node. Thus, it can be ensured that the user can view the correct first screen content as quickly as possible.

The method for a browser application to load a page's first screen according to the embodiments of the specification is described above with reference to FIG. 4 and FIGS. 5A-B. By actively caching key page information at the front end, the embodiments of the specification perform cached information-based page rendering and asynchronous updating and differential processing of the above key information in parallel, thereby greatly improving the first screen loading performance and optimizing the user experience while ensuring the page's dynamic features. It should be understood that the first screen loading method according to the embodiments of the specification may be part of the process of the browser application loading a complete page. After the first screen rendering is completed and displayed, the browser application may continue to render and display contents of subsequent screens.

Figure 6:
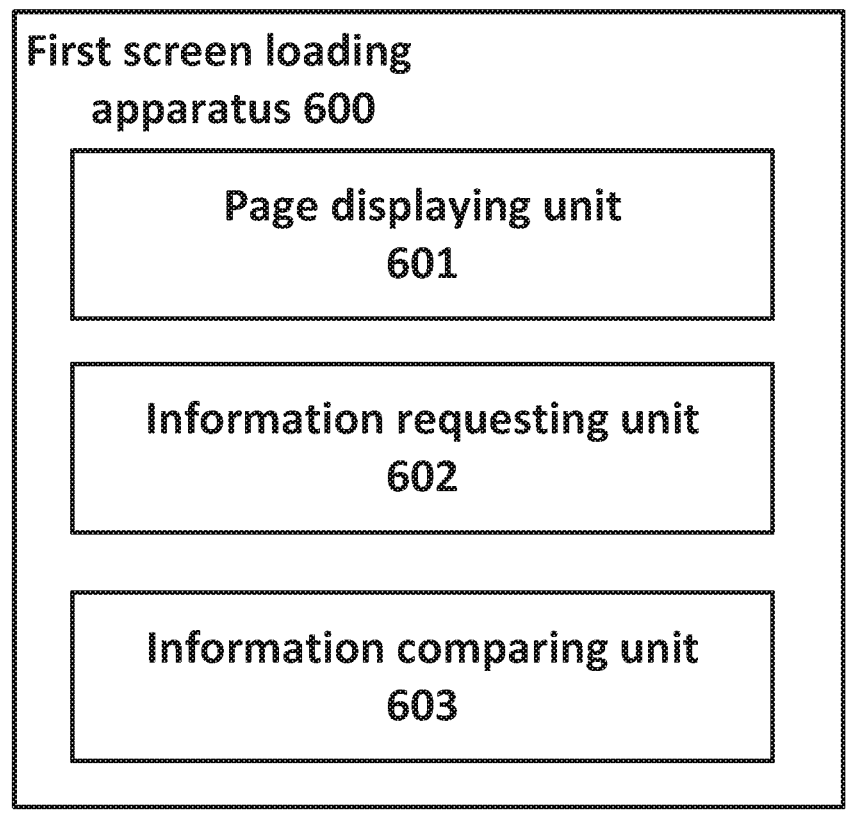
FIG. 6 is a schematic diagram of an apparatus for a browser to load a page's first screen according to some embodiments.

The first screen loading solution according to the embodiments of the specification may also be implemented as a first screen loading apparatus. FIG. 6 is a schematic diagram of an apparatus for a browser page to load a page's first screen according to some embodiments. As shown in FIG. 6, the first screen loading apparatus 600 may comprise a page displaying unit 601, an information requesting unit 602, and an information comparing unit 603.

The page displaying unit 601 may be configured to obtain, when page information of a target page to be displayed is stored in a local storage, the page information from the local storage for rendering in response to a request from a user to load the target page. The information requesting unit 602 may be configured to make, when page information of the target page to be displayed is stored in the local storage, a network request for first screen information of the target page in response to the request from the user to load the target page. The information comparing unit 603 may be configured to compare the first screen information obtained through the network request with the stored target page information. Subsequently, when the first screen information is updated, the page displaying unit 601 may be configured to use the updated first screen information to continue rendering the target page's first screen, and display the target page's first screen when the rendering of the target page's first screen is completed.

The first screen data of the target page in the network request by the first screen information requesting unit may be first screen dynamic data, such as data in json format.

In one embodiment, the information requesting unit 602 may be configured to perform dom-diff process on the first screen information obtained through the network request and the stored target page information to find an updated DOM tree node.

In one embodiment, when the first screen information is updated (e.g., the obtained first screen information is different from the stored target page information), the page displaying unit 601 may be configured to find an updated DOM tree node and amend the updated DOM tree node based on the first screen dynamic data; render the amended DOM tree node; and display the target page's first screen when the rendering is completed.

When page information of the target page to be displayed is not stored in the local storage, in response to a request from the user to load the target page, the information requesting unit 602 may obtain complete page information of the target page, and the page displaying unit renders and displays the target page based on the complete page information, and stores the complete page information in the local storage.

In some embodiments, when the first screen information is not updated, the page displaying unit 601 displays the target page's first screen when the rendering is completed with the cached target page information.

In some embodiments, the target page may be at least one of the following: a front-end rendered page; a server rendered page; and a page that is at least partially isomorphic. In addition, the local storage is a local storage associated with the browser application.

In some embodiments, the above first screen loading apparatus 600 and units thereof may be implemented as functional modules of a browser application. For example, the page displaying unit 601 and the information requesting unit 602 may be existing functional modules of the browser application, while the information comparing unit 603 may be a functional module additional to the existing functions modules.

In some embodiments, the computing device shown in FIG. 1 may also be configured to implement the first screen loading solution according to the embodiments of the specification. Specifically, a computing device may comprise: a processor; and a memory with executable codes stored thereon, wherein, when executed by the processor, the executable codes cause the processor to implement the above-described page presenting method or display method.

The method for a browser application to load a page's first screen according to the specification is described in detail above with reference to the accompanying drawings. By providing a local storage that can be controlled by the front end and by caching a page's first screen data in the local storage, this solution obtains, compares and updates dynamic data while rendering the cached content in subsequent accesses to the page, thereby achieving prompt updates and rapid display of contents of the first screen.

In addition, the method according to the embodiments of the specification may also be implemented as a computer program or a computer program product. The computer program or the computer program product comprises computer program codes and instructions for executing the above steps defined in the above method according to the embodiments of the specification.

In some embodiments, the embodiments of the specification may also be implemented as a non-transitory machine-readable storage medium (or computer readable storage medium or machine-readable storage medium) with executable codes (or computer program or computer instruction code) stored thereon. When executed by a processor of an electronic device (or computing device, server, etc.), the executable codes (or computer program or computer instruction code) may cause the processor to implement steps of the above-described method according to the embodiments of the specification.

In some embodiments, various exemplary logic blocks, modules, circuits and algorithm steps described with reference to the specification herein may be implemented as electronic hardware, computer software, or a combination thereof.

The flow charts and block diagrams in the accompanying drawings illustrate example system architectures, functions, and operations of the system and method according to a plurality of embodiments of the present invention. In some embodiments, each block in the flow charts and block diagrams may represent a module, a program segment, or a part of codes. The module, program segment, or part of codes may comprise one or more executable instructions for implementing prescribed logic functions. In some embodiments, functions marked in the blocks may also be performed in an order different from what is marked in the drawings. For example, two consecutive blocks may actually be executed substantially in parallel, or sometimes executed in a reverse order, depending on the involved functions. In some embodiments, each block in the block diagrams and/or flow charts, as well as combinations of blocks in the block diagrams and/or flow charts, may be implemented by a dedicated hardware-based system for executing prescribed functions or operations, or may be implemented by a combination of dedicated hardware and computer instructions. The embodiments of the present invention have been described above. The above description is exemplary and not exhaustive. Without departing from the scope and spirit of the described embodiments, many amendments and variations are obvious to those skilled in the art. Terms used herein are selected with an intention to best explain principles, practical applications, or improvements, to technologies on the market, of the embodiments, or to enable others of ordinary skills in the art to understand the embodiments disclosed herein.

What is claimed is:

1. A computer-implemented method, comprising:
   in response to a request to load a target page, obtaining page information of the target page from a local storage associated with a browser application;
   rendering the page information of the target page and requesting first screen information of the target page through a network, wherein the rendering of the page information of the target page and the requesting of the first screen information of the target page are performed in parallel, and the requesting first screen information of the target page comprises:
      making a network request for dynamic data rather than a page framework of the target page's first screen;
      comparing the first screen information obtained through the network with the page information of the target page obtained from the local storage associated with the browser application to determine whether the page information of the target page is updated;
   in response to the page information of the target page being determined as updated, continuing to render the target page's first screen based on the first screen information obtained through the network; and
   in response to the first screen information of the target page being determined as not updated, displaying the target page's first screen when the rendering of the page information of the target page is completed.

2. The method according to claim 1, wherein the dynamic data is in json format.

3. The method according to claim 1, wherein the comparing the first screen information obtained through the network with the page information of the target page comprises:
   performing Document Object Model-diff (DOM-diff) on the first screen information obtained through the network and the page information of the target page to find an updated DOM tree node.

4. The method according to claim 1, wherein the in response to the page information of the target page being determined as updated, rendering the target page's first screen based on the first screen information obtained through the network comprises:
   finding an updated DOM tree node and amending the updated DOM tree node based on the dynamic data in the target page's first screen; and
   rendering the amended DOM tree node.

5. The method according to claim 1, further comprising:
   when the page information of the target page is not stored in the local storage, obtaining complete page information of the target page for rendering and displaying in response to the request to load the target page, and storing the complete page information in the local storage.

6. The method according to claim 1, wherein the target page is at least one of the following:
   a front-end rendered page;
   a server rendered page; and
   a page that is at least partially isomorphic.

7. The method according to claim 1, wherein the local storage is a local storage created by the browser application.

8. A system comprising a processor and a non-transitory computer-readable storage medium storing instructions executable by the processor to cause the system to perform operations comprising:
   in response to a request to load a target page, obtaining page information of the target page from a local storage associated with a browser application;
   rendering the page information of the target page and requesting first screen information of the target page through a network, wherein the rendering of the page information of the target page and the requesting of the first screen information of the target page are performed in parallel, and the requesting first screen information of the target page comprises:
      making a network request for dynamic data rather than a page framework of the target page's first screen;
      comparing the first screen information obtained through the network with the page information of the target page obtained from the local storage associated with the browser application to determine whether the page information of the target page is updated;
   in response to the page information of the target page being determined as updated, continuing to render the target page's first screen based on the first screen information obtained through the network; and in response to the first screen information of the target page being determined as not updated, displaying the target page's first screen when the rendering of the page information of the target page is completed.

9. The system according to claim 8, wherein the comparing the first screen information obtained through the network with the page information of the target page comprises:
performing dom-diff on the first screen information obtained through the network and the page information of the target page to find an updated DOM tree node.

10. The system according to claim 8, wherein the in response to the page information of the target page being determined as updated, rendering the target page's first screen based on the first screen information obtained through the network comprises:
finding an updated DOM tree node and amending the updated DOM tree node based on the dynamic data in the target page's first screen; and
rendering the amended DOM tree node.

11. The system according to claim 8, wherein the operations further comprise:
when the page information of the target page to be displayed is not stored in the local storage, obtaining complete page information of the target page for rendering and displaying in response to the request to load the target page, and storing the complete page information in the local storage.

12. The system according to claim 8, wherein the target page is at least one of the following:
a front-end rendered page;
a server rendered page; and
a page that is at least partially isomorphic.

13. A non-transitory computer-readable storage medium configured with instructions executable by one or more processors to cause the one or more processors to perform operations comprising:
in response to a request to load a target page, obtaining page information of the target page from a local storage associated with a browser application;
rendering the page information of the target page and requesting first screen information of the target page through a network, wherein the rendering of the page information of the target page and the requesting of the first screen information of the target page are performed in parallel, and the requesting first screen information of the target page comprises:
making a network request for dynamic data rather than a page framework of the target page's first screen;
comparing the first screen information obtained through the network with the page information of the target page obtained from the local storage associated with the browser application to determine whether the page information of the target page is updated; and
in response to the page information of the target page being determined as updated, continuing to render the target page's first screen based on the first screen information obtained through the network; and
in response to the first screen information of the target page being determined as not updated, displaying the target page's first screen when the rendering of the page information of the target page is completed.

* * * * *